United States Patent [19]
Bartholomew

[11] Patent Number: 5,732,984
[45] Date of Patent: Mar. 31, 1998

[54] MANUALLY RELEASABLE QUICK CONNECTOR

[75] Inventor: Donald D. Bartholomew, Clemens, Mich.

[73] Assignee: Proprietary Technology, Inc., Bloomfield Hills, Mich.

[21] Appl. No.: 779,654

[22] Filed: Jan. 15, 1997

Related U.S. Application Data

[63] Continuation of Ser. No. 437,272, May 8, 1995, abandoned, which is a continuation-in-part of Ser. No. 9,009, Jan. 26, 1993, Pat. No. 5,413,387, which is a division of Ser. No. 506,449, Apr. 6, 1990, abandoned, which is a continuation of Ser. No. 360,405, Jun. 2, 1989, Pat. No. 4,936,544, which is a division of Ser. No. 251,038, Sep. 26, 1988, Pat. No. 4,915,136, which is a continuation of Ser. No. 127,532, Dec. 2, 1987, abandoned, which is a continuation of Ser. No. 748,307, Jun. 24, 1985, abandoned, which is a continuation of Ser. No. 360,201, Mar. 22, 1982, Pat. No. 4,601,497, which is a continuation-in-part of Ser. No. 201,711, Oct. 29, 1980, Pat. No. 4,423,892.

[51] Int. Cl.$^6$ ................................................ F16L 39/00
[52] U.S. Cl. ........................ 285/319; 285/921; 285/33
[58] Field of Search .............................. 285/319, 921, 285/33, 39, 424

[56] References Cited

U.S. PATENT DOCUMENTS

| | | |
|---|---|---|
| 4,681,351 | 7/1987 | Bartholomew . |
| 4,846,506 | 7/1989 | Bocson et al. ............... 285/319 X |
| 5,139,228 | 8/1992 | Norkey et al. ............... 285/921 X |
| 5,161,834 | 11/1992 | Norkey ............... 285/319 |
| 5,176,412 | 1/1993 | Washizu ............... 285/319 |
| 5,178,424 | 1/1993 | Klinger ............... 285/319 |
| 5,228,728 | 7/1993 | McNaughton et al. ............... 285/319 |
| 5,257,833 | 11/1993 | McNaughton . |
| 5,486,025 | 1/1996 | Ketcham ............... 285/319 |

*Primary Examiner*—Terry Lee Melius
*Assistant Examiner*—Heather Shackelford
*Attorney, Agent, or Firm*—Harness, Dickey & Pierce

[57] ABSTRACT

A swivelable quick connect assembly for use with tubular conduits is disclosed comprising a housing having an axial bore for receiving one end of the conduit, an elastomeric ring-like seal disposed in the bore for providing a fluid tight seal between confronting portions of the conduit and the housing, an annular bushing is disposed in the bore for positioning the seal and for guiding the one end of the conduit into nesting relationship with the bore, and a retainer detachably secured to the housing and cooperable with an annular projection on the conduit for securing the conduit in its operative position within the bore. The retainer is a one piece metal retainer element which includes at least two circumferentially spaced leg members which extend from an integral collar member at one end thereof. Each of the leg members has a deflectable leg portion which extends from the collar and ends in a first bend defined by an arcuate shape to provide a backstop for securing the retainer element in the connector assembly, and a retaining leg portion which extends from the deflectable leg portion and inclines generally toward the aperture in the collar.

21 Claims, 5 Drawing Sheets

EQUAL TO          MORE STRESS ON BEND

MANUALLY RELEASABLE QUICK CONNECTOR

CROSS REFERENCE TO RELATED APPLICATIONS

This application is a continuation of U.S. patent application Ser. No. 08/437,272 filed May 8, 1995 abn. which is a continuation-in-part of U.S. Ser. No. 08/009,009, filed Jan. 26, 1993, to be issued on May 9, 1995, as U.S. Pat. No. 5,413,387, which is a divisional of Ser. No. 07/506,449, filed Apr. 6, 1990, now abandoned, which is a continuation of U.S. Ser. No. 07/360,405, filed Jun. 2, 1989, issued on Jun. 26, 1990, as U.S. Pat. No. 4,936,544, which is a divisional of U.S. Ser. No. 07/251,038, filed Sep. 26, 1988, issued on Apr. 10, 1990, as U.S. Pat. No. 4,915,136 which is a continuation of U.S. Ser. No. 07/127,532, filed Dec. 2, 1987, now abandoned, which is a continuation of U.S. Ser. No. 06/748,307, filed Jun. 24, 1985, now abandoned, which is a continuation of U.S. Ser. No. 06/360,201, filed Mar. 22, 1982, issued Jul. 22, 1986 as U.S. Pat. No. 4,601,497, which is a continuation-in-part of U.S. Ser. No. 06/201,711, filed Oct. 29, 1980, issued Jan. 3, 1984 as U.S. Pat. No. 4,423,892, which is incorporated here by reference.

BACKGROUND OF THE INVENTION

1. Field of the Invention

The present invention relates to a connector assembly for providing a swivelable quick connection. More particularly, the present invention relates to a connector assembly including spring components that will retain their resiliency after repeated connections and disconnections while effectively distributing force between the male conduit and the female housing.

2. Description of the Relevant Art

In the automotive industry, as well as for many other industries, the need always exists for low-cost, reliable, and easy to assemble components. This need is especially apparent with respect to providing a connection between fluid carrying conduits, such as fuel or refrigerant lines. In older threaded connectors, substantial assembly time could be accumulated in screwing a cap onto a fitting and tightening the cap down to the proper torque needed to provided for a fluid tight seal. Further, an inventory would have to be maintained to keep track of the number of caps and fittings, and any liners or other components that may be necessary. Also, retightening of the caps may be required to maintain the seal after the automobile or other system has been put in use.

In response to this need, efforts have been made to provide an improved connector assembly for providing a swivelable quick connection between fluid conveying conduits. One such connector is disclosed in U.S. Pat. No. 4,681,351, issued to Bartholomew on Jul. 21, 1987 for SWIVELABLE QUICK CONNECTOR ASSEMBLY and assigned to the common assignee of the present invention. Another connector along these lines is disclosed in U.S. Pat. No. 5,257,833, issued to McNaughton et al. on Nov. 2, 1993 for METAL RETAINER FOR QUICK CONNECT TUBING CONNECTOR. Both of these references are directed to the swivelable connection between a female housing and a male conduit which is accomplished by a resilient retainer element that retains the male conduit within the female housing.

While representing advances in the area of swivelable connector technology, neither of these references is directed to the problems of force distribution between the male and female components and repeated connection and disconnection of the components with respect to each other. Both of these references teach the use of a retainer element that comprises a leg portion positioned for engagement between a male conduit and a female housing. The leg portion includes a severely bent area that defines a retaining element for engagement with the female housing. The designs of the known art which incorporate this severely bent area are disadvantageous both in terms of wear and the distribution of force between the male conduit and the female housing. Failure to properly address these disadvantages resulted in the known designs which may lead to the premature wear of the retainer element which could result in an unsatisfactory coupling and the possibility of fluid loss if the integrity of a connection of a line carrying fluids is compromised.

Accordingly, none of the known methods of providing quick and swivelable connection between male and female fluid line components has delivered optimum results.

SUMMARY OF THE INVENTION

Accordingly, it is an object of the present invention to provide a connector that incorporates a resilient retainer element that distributes forces equally between the female housing and the male conduit.

It is a further object of the present invention to provide such a connector that is able to withstand repeated connection and disconnection of a male connector and a female housing without significant signs of fatigue and without consequent fracturing.

Another object of the present invention is to provide such a connector that is freely swivelable while retaining the above-stated characteristics.

It is a still a further object of the present invention to provide such a connector that is usable without the need for mechanical tools.

Another object of the present invention is to provide a pre-assembled connector housing and retainer element so that a snapping connection may be made to a tubular fluid-conveying conduit.

Another object of the present invention is to provide a connector assembly that may be employed to join dissimilar electrically conducting materials that would be otherwise subject to galvanic corrosion.

It is a further object of the present invention to provide a connector assembly which is adapted to provide for a bleed-down position when disconnecting a conduit from the housing of the connector assembly.

It is another object of the present invention to provide a pre-assembled connector conduit unit which requires only a one-step snapping connection to be joined to a connector housing.

It is also an object of the present invention to provide an improved retainer element which operates to both secure the conduit in the axial bore of the housing and position the sealing element within the axial bore of the housing.

It is a more specific object of the present invention to provide an improved retainer element formed with two or more leg members which operate to detachably secure the retainer element to the housing, the sealing means within the housing, the conduit in its operative position within the axial bore of the housing, and provide better resistance to off-axis forces on the conduit.

To achieve the foregoing objects, the present invention provides a swivelable connector assembly which generally comprises a tubular conduit, a housing, sealing means, and retainer means. The tubular conduit is adapted to convey fluid and is formed with an annular projection disposed a predetermined distance from the end of the conduit to be connected. The housing is formed with an axial bore for receiving the conduit at a first end and for providing a fluid path at a second end, and includes an inwardly extending annular lip (or suitable apertures) at the first end to detachably secure the retainer means to the housing. The sealing means is disposed within the axial bore of the housing for providing a fluid tight seal between confronting portions of the conduit and the housing. The retainer means is adapted to be disposed generally within the axial bore of the housing for cooperating with the annular projection of the conduit to secure the conduit in its operative position within the axial bore of the housing. The retainer means is a one piece metal retainer element which includes at least two circumferentially spaced leg members which extend from an integral collar member at one end thereof.

Each of the leg members has a deflectable leg portion which extends from the collar and ends in an arcuate first bend designed to provide a backstop for securing the retainer element in the connector assembly, and a retaining leg portion which extends from the deflectable leg portion and inclines generally toward the aperture in the collar. The end of the retaining leg portion is formed to engage the conduit such that the retaining leg portion will resist the disconnection of the conduit from the connector assembly.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which.

DETAILED DESCRIPTION OF THE PREFERRED EMBODIMENT

The drawings disclose the preferred embodiment of the present invention. While the configurations according to the illustrated embodiment are preferred, it is envisioned that alternate configurations of the present invention may be adopted without deviating from the invention as portrayed. The preferred embodiment is discussed hereafter.

Figure 1:
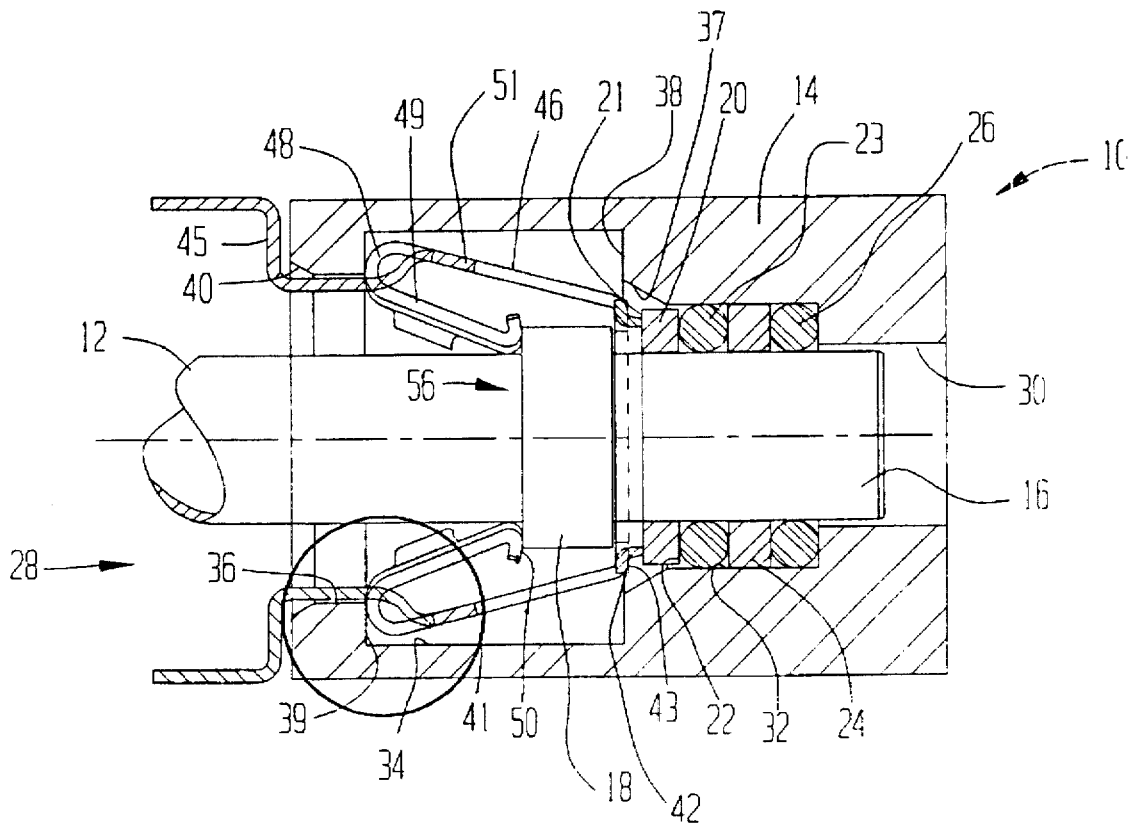
FIG. 1 is a side elevation view, partially in cross-section, of an embodiment of a connector assembly having a retainer element according to the present invention.

Referring to FIG. 1, a side elevation view, partially in cross section of an embodiment of a connector assembly of the present invention is shown and is generally illustrated as 10. The connector assembly 10 includes a male conduit 12 and a female housing 14. The male conduit 12 includes an end 16 having a finished surface as appropriate to form a fluid-tight seal with fluid seals as discussed below. Adjacent the end 16 is a conduit flange 18 that operates to secure the conduit 12 within the female housing 14.

A tubular flanged collar 20 having a first side 21 and a second side 22 is fitted to the conduit 12. Adjacent the collar 20 is a first seal 23, an annular bushing 24, and a second seal 26. The first and second seals 23 and 26 respectively are preferably O-ring type seals composed of an elastomeric, fluid-seal providing material. The annular bushing 24 functions to both position of the seals 23 and 26 and to guide the end 16 into nesting relationship within the female member 14. Those skilled in the art will understand that arrangement of the seals and the bushing as set forth is not intended to be limiting but may well be modified to meet the particular needs of each connector.

The female housing 14 includes a throughbore 28 into which the male conduit 12 is selectively fitted. The throughbore 28 is subdivided into distinct regions including a first bore 30 which receives the most distal portion of the end 16 of the conduit 12, a second bore 32 into which the seals 23 and 26 and the bushing 24 as well as a portion of the collar 20 are fitted, a third bore 34, and a fourth bore 36. Adjacent the second bore 32 is a chamfered lead-in portion 37. The lead-in portion 37 is formed to provide an area that is gradually reduced in diameter toward the second bore 32. As such, the overall diameters of the seals 23 and 26 are reduced by the lead-in portion 37 upon insertion of the conduit 12 into the housing 14.

Figure 2:
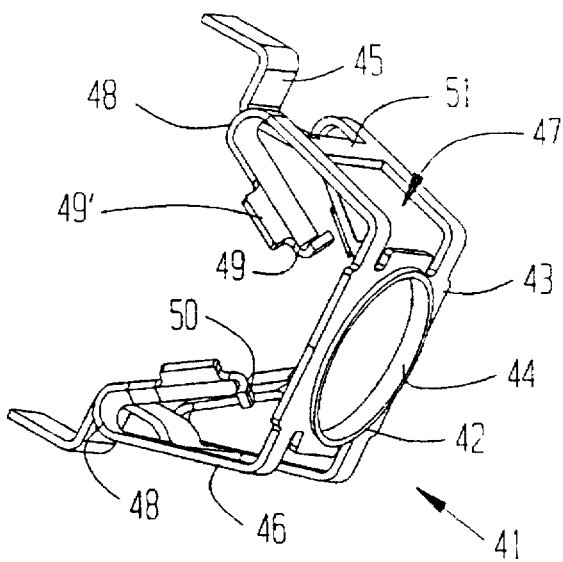
FIG. 2 is a perspective view of the retainer element of FIG. 1 shown in isolation.

Between the lead-in portion 37 and the third bore 34 is formed a radial wall 38 against which acts as an inward stop for the retainer 41 of FIG. 2. This relationship prevents excessive insertion of the male conduit 12 into the female housing 14.

A radial wall 39 is formed between the third bore 34 and the fourth bore 36. The radial wall 39 functions in engagement of the male conduit 12 in the female housing 14, as will be described below. A lead-in chamfer 40 is formed at the outermost end of the female housing 14.

Figure 4:
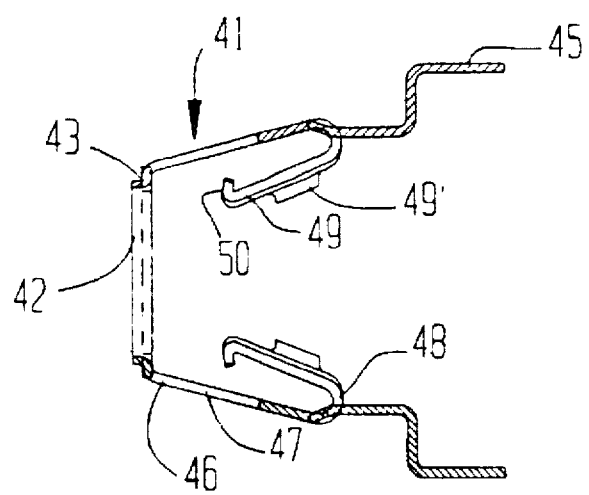
FIG. 4 is a side view of the retainer element of FIG. 1 shown in isolation.

FIG. 4 illustrates a side view of the operative retaining element of the present invention. With reference then to both FIGS. 1 and 4, a resilient retainer element 41 is shown in position between the male conduit 12 and the female housing 14 in FIG. 1 and in isolation in FIG. 4. In the embodiment illustrated in these figures, the retainer element 41 is preferably a one-piece construction that is manufactured from a metallic material. The retainer element 41 includes a collar 42, a body element 43, at least one or more deflectable fingers 45, and at least one or more legs 46.

The collar 42 is positioned adjacent the wall 21 of the collar 20 and has an aperture 44 (shown in FIGS. 2, 3, 5, and 6) for providing passage of the conduit 12 through the retainer element 41. Each of the legs 46 projects from the body element 43 and bends at an arc at area 48 forming a backstop for locking engagement with the radial wall 39. The arcuate area 48, in turn, connects a retaining portion 49 which bends, partially doubling back on itself, forming a flange 50. When the male conduit 12 is locked into position in the female housing 14, the flange 50 resiliently engages a surface 56 formed on the conduit flange 18 of the male conduit.

As now may be clearly understood, The lead-in chamfer 40 serves to lead in the retainer 41 whereby the retainer 41 is structured such that upon insertion of the male conduit 12 into the female housing 14, the legs 46 are reduced by the chamfer 40 as the retainer 41 is squeezed toward the central axis of the conduit 12. A cut out area 47 is shown between adjacent legs 46 to define the legs 46 as springs that must bend in response to the entry of the male conduit 12 (and male conduit flange 18 into female 14) sufficiently to reduce the bending force on area 48 and prevent the breaking away of retaining portion 49 from the legs 46.

As noted, the backstop 48 abuts against the radial wall 39 for securing the retainer element 41 in the housing 14. Simultaneously, and in the engaged position, the flange 50 biases on the conduit flange 18 securing the conduit 12 in the retainer element 41.

Figure 6:
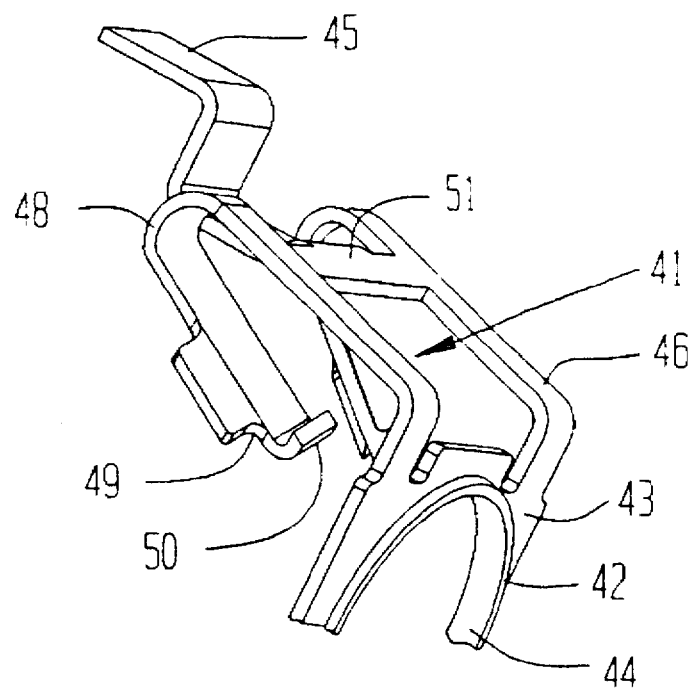
FIG. 6 is a partial cross-sectional perspective view of the retainer element of FIG. 1.

Referring to FIGS. 2 and 6, perspective views of the retainer element 41 are illustrated. In FIG. 2 the retainer element 41 is shown in its entirety, while in FIG. 6 it is only partially shown. As illustrated, a member 51 interconnects a pair of substantially parallel legs 46. The fingers 45 project from the legs 46. The fingers 45 provide a means for grasping and removing the retainer element 41 from the female housing 14. The fingers 45 are generally bent in accordance with conventional sheet metal practice. While a single finger 45 is illustrated for each substantially parallel pair of legs 46, it is possible that each leg 46 would have its own finger.

Figure 3:
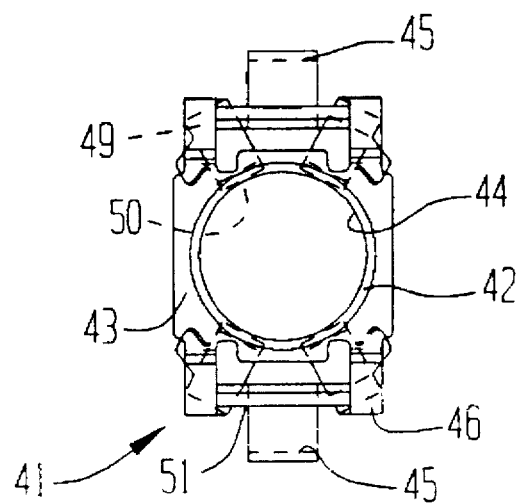
FIG. 3 is an end view of the retainer element of FIG. 1 shown in isolation.

FIG. 3 is an end view of the retainer element 41 and illustrates the position of the collar 42 with respect to the body 43, one of the legs 46, and the fingers 45. This view also illustrates the inwardly-facing position of the retaining portion 49 and the position of the flanges 50 with respect to the aperture 44.

Figure 5:
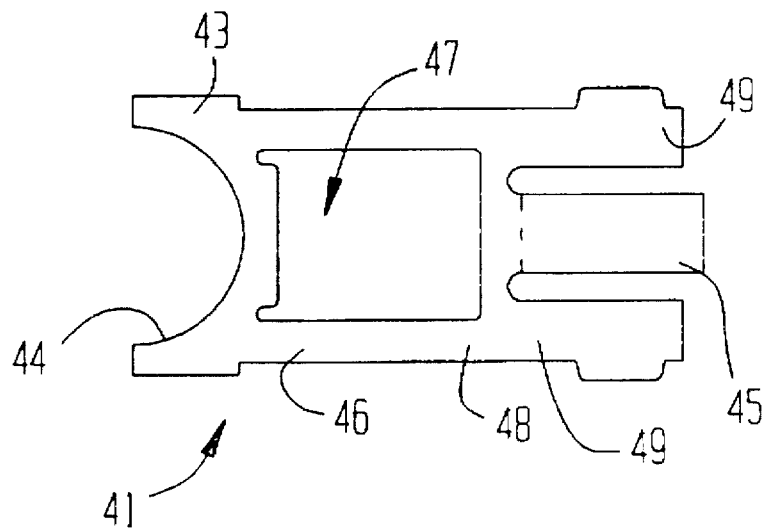
FIG. 5 is an expanded plan view of half of the blank for the retainer element of FIG. 1.

FIG. 5 is an expanded plan view showing approximately half of the retainer element 41 prior to its being bent into the shape illustrated in the other figures. As noted, the retainer element 41 is preferably formed from a metallic material, and the form illustrated in FIG. 5 shows how the element 41 appears after stamping but before being selectively bent to assume the functional retainer shape shown in the other figures.

Figure 7:
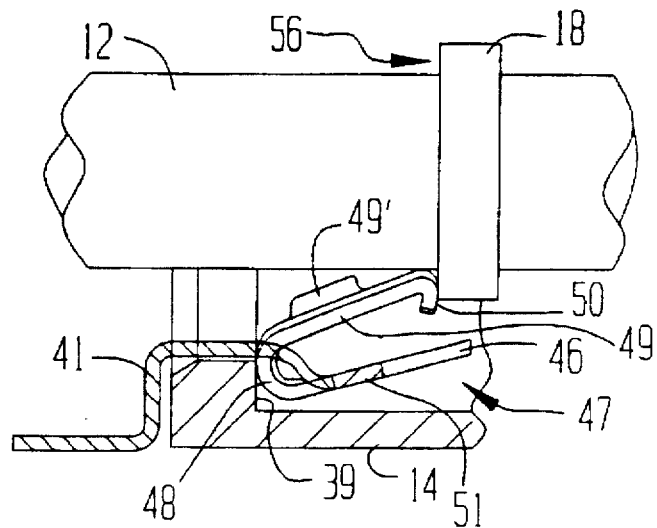
FIG. 7 is a side elevational view in partial cross section of a portion of the retainer element of FIG. 1 in position between the male conduit and the female housing.

FIG. 7 is a close-up, detailed side elevational view in partial cross section of a portion of the retainer element 41 in its locking and engaged position between the male conduit 12 and the female housing 14. This detailed view more clearly discloses the advantages of the present design over known retainers.

Specifically, the present design provides at least two significant advantages over the prior art. One advantage represents an improvement in wear characteristics, while the other advantage represents an improvement in locking characteristics.

With respect to the first advantage, the sharply bent connection between the outer leg (part of the leg 46 in the illustrated invention) and the inner leg (retaining portion or arm 49 in the illustrated invention). During formation, the sharp bending of the metal 48 connecting the inner and outer legs stresses the material such that the integrity of the metal defining the bend itself is significantly compromised. This is particularly a problem on repeated insertion and removal of the male conduit and the female housing, where such repeated use often results in fracturing of the metal at the bend 48, and subsequent failure of the connection.

The illustrated design of the present invention overcomes this difficulty by minimally stressing the metal at the bend that defines the arcuate area 48. Because the design represents a gently curving bend 48, and because of the spring arms 46, the stress is reduced on the narrow area of the metal form, and the stress is equally distributed over a wide area, thus minimizing the likelihood of fracture after repeated connection and disconnection.

With respect to the second advantage, the force on the expanded diameter 18 of the male conduit 12 is also better distributed by the ends 50 of retainer arms 49. Shown in FIG. 4 are stiffeners 49' for the retainer arms 49. The stiffeners 49' are shown only part way on the straight section of arms 49, but they may be over the full extent of arms 49 between where the bending takes place for areas 50 and 48.

Figure 8:
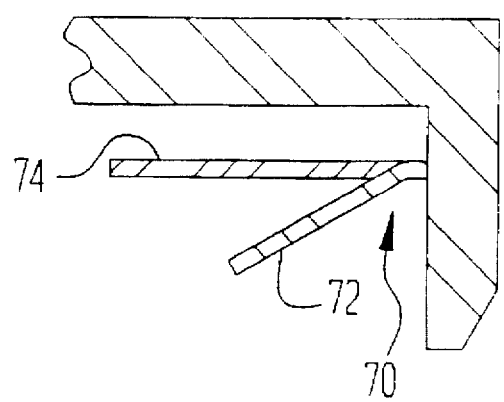
FIG. 8 is a partial view of a prior art connector retaining element shown in relation with a female housing.

FIG. 8 illustrates a bend (generally illustrated as 70) between an inner leg 72 and an outer leg 74 that is typical of the prior art. The outer leg 74 is stiff and the inner leg 72 combines the required bending and the resistance to pull-out of the male from the female. Constructions such as this cannot have the resistance to pull apart that the stiffer construction that elements 49 and 49' confer to the retainer 41.

Figure 9:
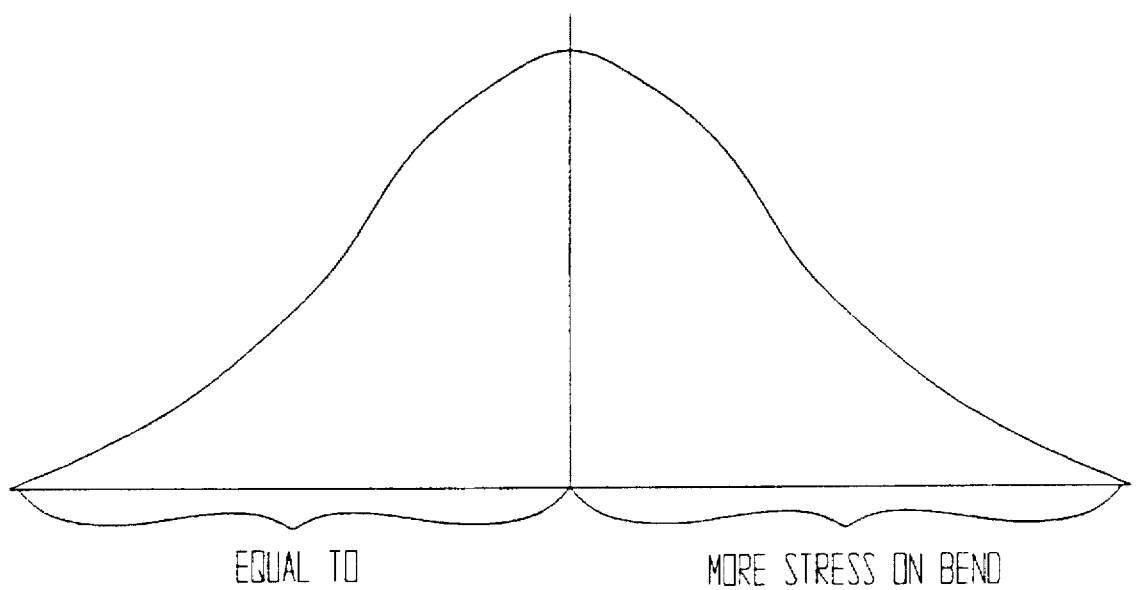
FIG. 9 is a Gauss curve demonstrating an ideal force transfer versus characteristic undesirable prior art force transfers.
Figure 10:
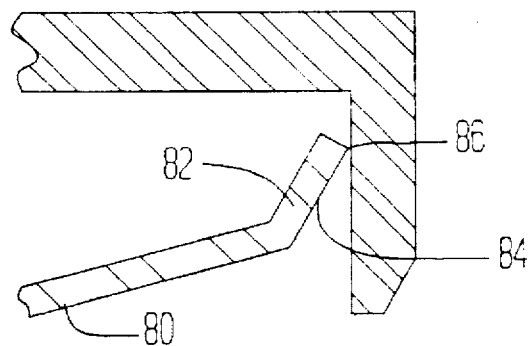
FIG. 10 is a partial view of an additional prior art connector retaining element shown in relation with a female housing.

FIG. 9 shows a Gauss curve that represents the fit and tolerances to be expected when a retainer is constructed as shown in FIG. 10. In FIG. 10, the retainer arm 80 has a bend 82 that is between arm 80 and pad 84. FIG. 10 is drawn in a position where the tip 86 of the pad 84 is passing the forces that would separate the male conduit from the female housing. This corresponds to the left half of the Gauss curve of FIG. 9. There is a lever arm, the distance down tab 84 from tip 86 to bend 82, that increases the bending force on area 82 as a result of the force that is being transmitted to the female housing by the tip of the pad 86. This means that in FIG. 9, those tolerance situations on the left side of the Gauss curve are a worse force on bend 82, and tolerances that cause the force transmitted from arm 80 to be transmitted to the female housing by the bend 82 are as good as the embodiment of retainer 41 that is shown, all things being equal (and they can be equal). Accordingly, FIG. 10 type construction with the pads can only be as good only 50 percent of the time.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. In a quick connect assembly comprising a male conduit, a female housing, and a retainer element, the male conduit having an end and a flange spaced apart from the end, the female housing having a first bore, a radial wall formed within said first bore, and an outer wall substantially parallel with and spaced apart from the radial wall, the male conduit being partially fittable within the first bore of the female housing, characterized in an improvement in the retainer element comprising:

a body, said body having a collar;

a pair of deflectable leg assemblies projecting from said body, each of said leg assemblies including:

a pair of spaced apart legs, each of said spaced apart legs having a proximal end and a distal end, said proximal end being attached to said body;

an interconnecting member connecting said distal ends of said pair of spaced apart legs; and a pair of spaced-apart retaining portions extending from said interconnecting member, each of said pair of spaced-apart retaining portions including an arcuate area for substantially fully biasing on the radial wall of the female housing and a flange for substantially fully biasing on the flange of the male conduit.

2. The quick connect assembly of claim 1, wherein said collar includes an aperture therethrough for passage of the male conduit.

3. The quick connect assembly of claim 1, wherein said collar is positionable between the flange of the male conduit and the first bore of the female housing.

4. The quick connect assembly of claim 1, wherein said retaining portions are stiffened.

5. The quick connect assembly of claim 1, wherein said body is composed of a metal.

6. The quick connect assembly of claim 1, further including a user-operable finger continuous with said interconnecting member and extending substantially from between said pair of spaced-apart retaining portions.

7. In a quick connect assembly comprising a male conduit, a female housing, and a retainer element, the male conduit having an end and a flange spaced apart from the end, the female housing having a first bore, a radial wall formed within said first bore, and an outer wall substantially parallel with and spaced apart from the radial wall, the male conduit being partially fittable within the first bore of the female housing, characterized in an improvement in the retainer element comprising:

a body, said body having a collar;

a pair of deflectable leg assemblies projecting from said body, each of said leg assemblies including:

a pair of spaced apart legs, each of said spaced apart legs having a proximal end and a distal end, said proximal end being attached to said body;

an interconnecting member connecting said distal ends of said pair of spaced apart legs;

a pair of spaced-apart retaining portions extending from said interconnecting member; and a user-operable finger continuous with said interconnecting member and extending substantially from between said pair of spaced-apart retaining portions.

8. The quick connect assembly of claim 7, wherein said collar includes an aperture therethrough for passage of the male conduit.

9. The quick connect assembly of claim 7, wherein said collar is positionable between the flange of the male conduit and the first bore of the female housing.

10. The quick connect assembly of claim 7, wherein said retaining portions are stiffened.

11. The quick connect assembly of claim 7, wherein said body is composed of a metal.

12. The quick connect assembly of claim 7, wherein each of said pair of spaced-apart retaining portions includes an arcuate area for substantially fully biasing on the radial wall of the female housing and a flange for substantially fully biasing on the flange of the male conduit.

13. In a quick connect assembly comprising a male conduit, a female housing, and a retainer element, the male conduit having a surface, an end, and a flange spaced apart from the end, the female housing having a first bore, a radial wall formed within said first bore, and an outer wall substantially parallel with and spaced apart from the radial wall, the male conduit being partially fittable within the first bore of the female housing, characterized in an improvement in the retainer element comprising:

a body, said body having a collar;

a pair of deflectable leg assemblies projecting from said body, each of said leg assemblies including:

a pair of spaced apart legs, each of said spaced apart legs having a proximal end and a distal end, said proximal end being attached to said body;

an interconnecting member connecting said distal ends of said pair of spaced apart legs;

a pair of spaced-apart retaining portions extending from said interconnecting member; and a pair of spaced-apart retaining portions extending from said interconnecting member, each of said pair of spaced-apart retaining portions including a retainer flange for biasing on the flange of the male conduit, whereby said pair of deflectable leg assemblies define four flanges which provide an array of four points of contact biasing on the flange of the male conduit.

14. The quick connect assembly of claim 13, wherein said collar includes an aperture therethrough for passage of the male conduit.

15. The quick connect assembly of claim 13, wherein said collar is positionable between the flange of the male conduit and the first bore of the female housing.

16. The quick connect assembly of claim 13, wherein said retaining portions are stiffened.

17. The quick connect assembly of claim 13, wherein said body is composed of a metal.

18. The quick connect assembly of claim 13, further including a user-operable finger continuous with said interconnecting member and extending substantially from between said pair of spaced-apart retaining portions.

19. In a quick connect assembly comprising a male conduit, a female housing, and a retainer element, the male conduit having an end and a flange spaced apart from the end, the female housing having a first bore, a radial wall formed within said first bore, and an outer wall substantially parallel with and spaced apart from the radial wall, the male conduit being partially fittable within the first bore of the female housing, characterized in an improvement in the retainer element comprising:

a body, said body having a collar;

a pair of deflectable leg assemblies projecting from said body, each of said leg assemblies including:

a pair of spaced apart legs, each of said spaced apart legs having a proximal end and a distal end, said proximal end being attached to said body;

an interconnecting member connecting said distal ends of said pair of spaced apart legs;

a pair of spaced-apart retaining portions extending from said interconnecting member; and a user-operable finger extending from said interconnecting member, said finger defining a proximal portion connected to said interconnecting member, said proximal portion defining a first elevation from the male conduit, an intermediate portion, and a distal portion, said distal portion defining a second elevation from the male conduit, said first elevation being less than said second elevation, each of said proximal, intermediate, and distal portions extending outside of the female housing when the male conduit is connected to the female housing.

20. The quick connect assembly of claim 19, wherein said collar includes an aperture therethrough for passage of the male conduit.

21. The quick connect assembly of claim 19, wherein said collar is positionable between the flange of the male conduit and the first bore of the female housing.

* * * * *